United States Patent [19]
Clare

[11] Patent Number: 5,546,983
[45] Date of Patent: Aug. 20, 1996

[54] SHUT-OFF VALVE

[75] Inventor: Manamohan Clare, Mississauga, Canada

[73] Assignee: Friedrich Grohe Aktiengesellschaft, Hemer, Germany

[21] Appl. No.: 334,790

[22] Filed: Nov. 3, 1994

[51] Int. Cl.$^6$ ............................................. F16K 11/20
[52] U.S. Cl. ................................. 137/607; 251/230
[58] Field of Search ..................... 137/606, 607; 251/230

[56]  References Cited

U.S. PATENT DOCUMENTS

| | | | |
|---|---|---|---|
| 3,758,028 | 9/1973 | Lange | 137/607 X |
| 4,221,238 | 9/1980 | Madsen | 251/230 |
| 4,250,919 | 2/1981 | Booth et al. | 137/607 |
| 4,344,457 | 8/1982 | Caroli | 251/230 X |
| 4,771,985 | 9/1988 | Gross et al. | 251/230 X |
| 4,840,351 | 6/1989 | Lii | 251/230 |
| 4,901,750 | 2/1990 | Nicklas et al. | 137/607 X |

Primary Examiner—Stephen M. Hepperle
Attorney, Agent, or Firm—Herbert Dubno

[57]  ABSTRACT

The invention provides a quick-acting shut-off valve for hydraulic installations, particularly for pressure balanced mixing valves such as might be used in a shower/tub installation. The shut-off valve includes a casing mounted to the installation housing adjacent an inlet port thereof, there being a reciprocable actuator sealingly retained within the casing for direct movement between first and second positions. The actuator carries a valve member at a distal end thereof for sealingly blocking the inlet port when the actuator is in its second position. When the actuator is in its first position the inlet port is open to normal water flow therethrough. The actuator utilizes a simple push-on, push-off ratchet mechanism to effect movement between the two operating positions thereof. The shut-off valve is readily accessible for quick operation and, when the installation needs repair, it is not necessary to locate a master control valve to terminate water flow to the installation, thereby maintaining water flow to other installations in the same hydraulic circuit.

6 Claims, 7 Drawing Sheets

SHUT-OFF VALVE

The present invention relates to pressure balanced water mixing valves, especially for shower installations, and to a valve mechanism for such valves for instantly shutting off water flow thereto for repair situations.

BACKGROUND OF THE INVENTION

There is a multitude of different pressure and/or temperature balanced mixing valves on the market today, such valves being primarily used in residential or commercial installations for showers or sinks. Such valves have a single control handle, the movement of which determines the water flow rate and the temperature of the water exiting the valve. Typically, the valve installation will have a valve handle that is rotatable to control the water temperature and that is pulled or pushed relative to the valve housing to control the flow rate. Commonly owned Canadian Patent No. 1,050,853 issued on Mar. 20, 1979 presents a typical pressure balanced shower valve.

Valves of the above type are mounted behind a wall of a shower installation and include a pair of inlet ports, one for the hot water and one for the cold water. These inlets ports are usually situated on opposite sides of the valve housing. A single outlet port for water of the desired temperature and pressure is provided and is connectable to the shower head itself, which projects into the shower stall. A control stem projects from the valve housing into the shower stall and is connected to the valve handle. A replaceable cartridge within the valve housing accepts the hot and cold water and mixes it in the correct proportions, under control of the handle and feeds the mixed water to the outlet port.

When these single handle pressure balance valves are installed in commercial buildings such as hotels there can be a problem when a valve must be repaired, since the hot and cold water supplies must be shut off before repairs can be effected. Very often there is only a master control valve for the hot and cold water supplies within the building and when they are shut off there is no flow to the entire building. If only one valve needs to be repaired all other units must suffer while the broken valve is fixed. Even if there are shut off valves within the unit, they are often relatively inaccessible and they may be frozen open if they have not been used for a long time. There is therefore a need to have a mechanism for shutting off the hot and cold water supplies to a pressure balanced mixing valve in a quick and reliable manner, which mechanism should be simple, effective and unobtrusive.

SUMMARY OF THE INVENTION

The present invention meets the requirements specified above. It provides shut-off means for the hot and cold water supplies to a pressure balanced mixing valve, which means involve a quick-acting ball valve permanently installed at both inlet ports of the mixing valve, the ball valves being accessible to the repairman whenever he removes the escutcheon or face plate of the mixing valve to expose the mixing valve itself. Each ball valve presents a push button to the repairman and all that he has to do to stop the water flow is to push down on the button until he detects that the ball valve has ratcheted into a locked position. When that has occurred he knows that the ball valve is now blocking the inlet port and that no more water will flow from that supply into the mixing valve. When both ball valves have been actuated he can dismantle the mixing valve and effect the necessary repairs. When the repairs have been completed he pushes down again on each push button to release the ratchet locking mechanism of each ball valve, thereby allowing the ball valves to move from their blocking positions into positions allowing for the free flow of water into the mixing valve. The ratchet locking mechanism used with the present invention is similar to the locking mechanism used with a common retractable ball point pen. The ball valves of the present invention are simple and immediate in their operation and they are economical to provide as an adjunct to commercially available mixing valves.

Broadly speaking, therefore the present invention may be considered as providing a pressure balanced valve assembly comprising a valve housing having inlet ports for hot and cold water, an outlet port for properly mixed water of a desired temperature and pressure, means for controlling the valve and hence the temperature and pressure of water exiting the outlet port, and means for quickly stopping water flow into the valve housing at the inlet ports, the stopping means comprising, for each inlet port: casing means on the housing and providing access to the inlet port adjacent thereto; a reciprocable valve actuator sealingly retained within the casing for direct movement between first and second positions; and a valve member fixed to the actuator for sealingly blocking the inlet port when the actuator is in the second position, the inlet port being open to normal water flow when the actuator is in the first position.

Furthermore, the invention can be used in other hydraulic installations of a more general nature, and thus may be considered as providing a quick-acting shut-off valve for an inlet port of an hydraulic installation having a housing containing such inlet port, comprising: casing means on the housing and providing access to the inlet port adjacent thereto; a reciprocable valve actuator sealingly retained within the casing for direct movement between first and second positions; and a valve member fixed to the actuator for sealingly blocking the inlet port when the actuator is in the second position, the inlet port being open to normal water flow when the actuator is in the first position.

DESCRIPTION OF THE PREFERRED EMBODIMENT

Figure 1:
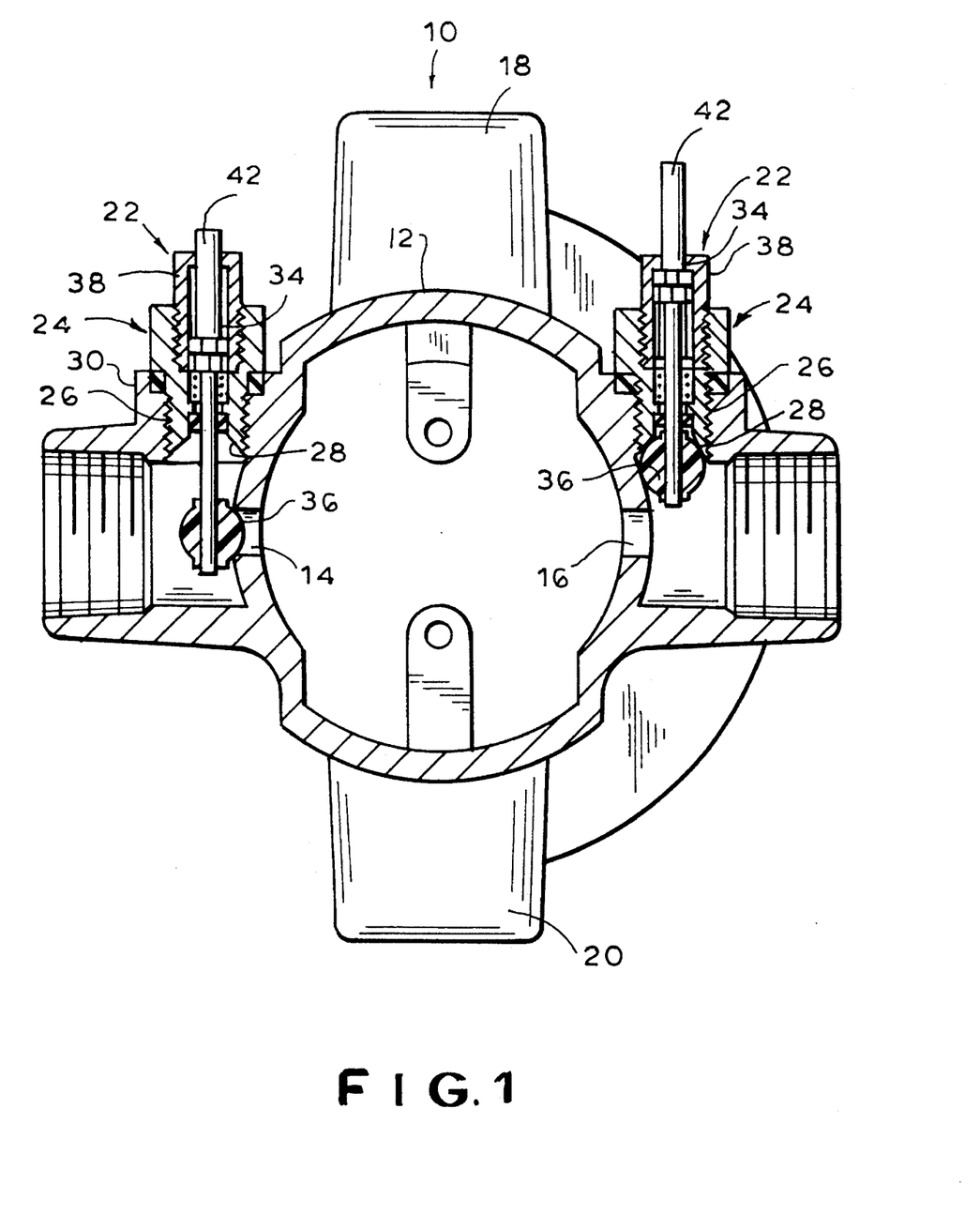
FIG. 1 is a vertical cross-section through a pressure balanced valve housing showing the shut-off valves of the invention in position.
Figure 2:
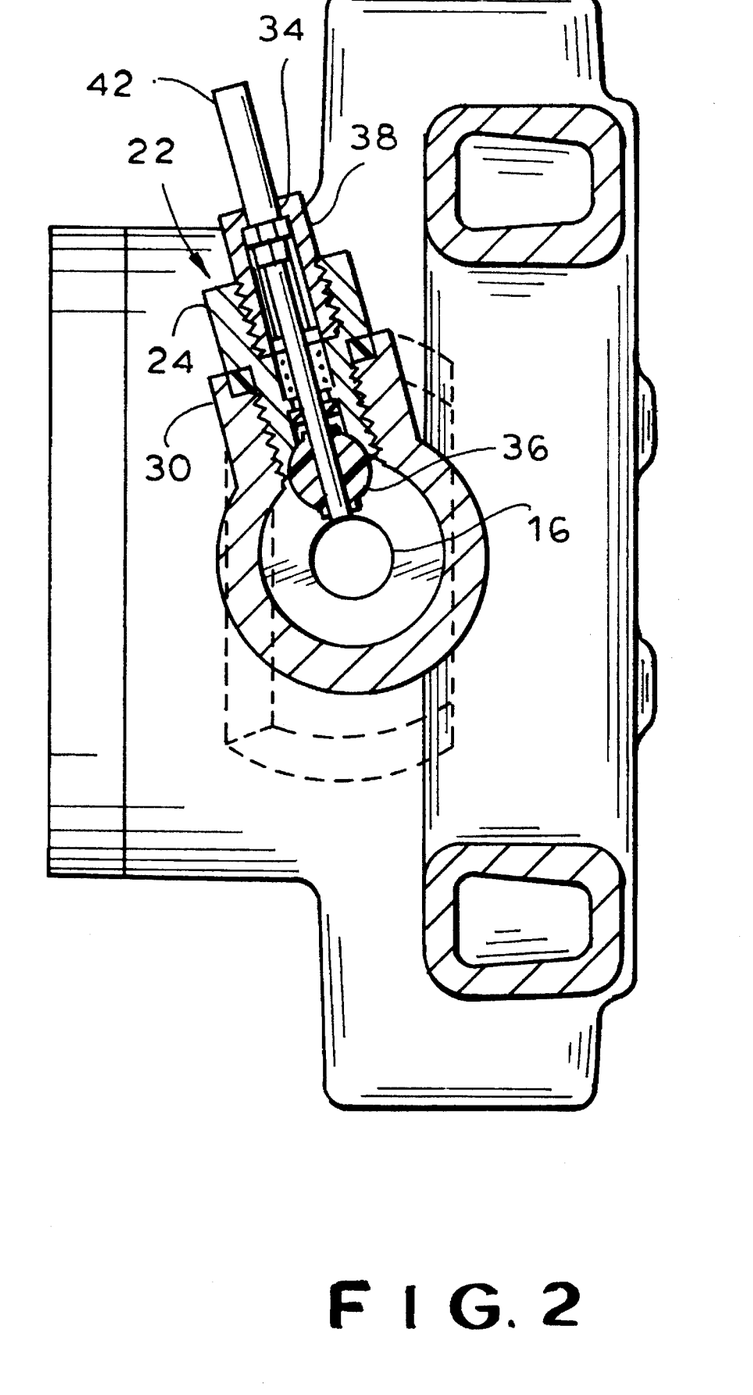
FIG. 2 is an end cross-section of the apparatus of FIG. 1 with the shut-off valve in an open position.
Figure 3:
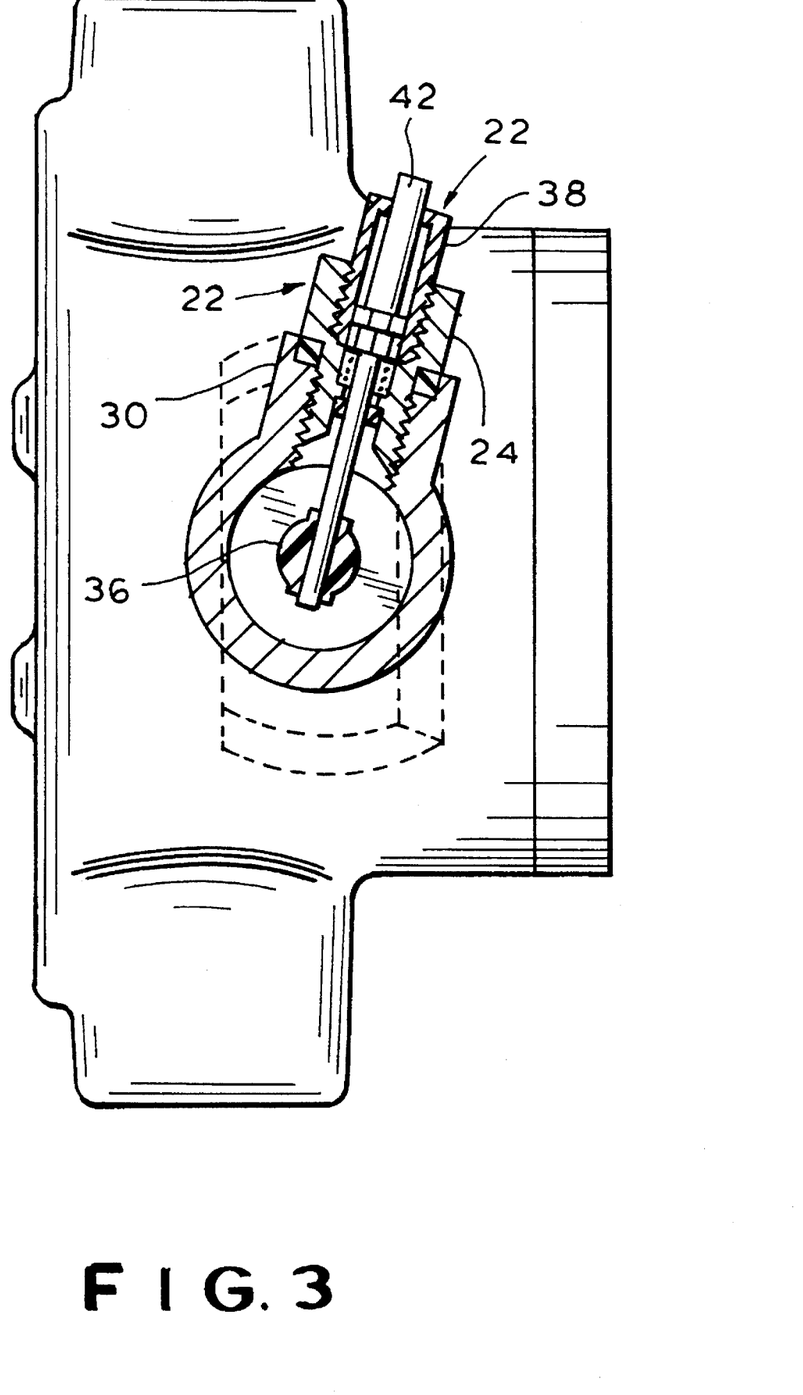
FIG. 3 is an end cross-section of the apparatus of FIG. 1 with the shut-off valve in a closed position.

FIG. 1 illustrates in cross-section a typical pressure balanced mixing valve 10 such as might be used in a shower/tub installation in a residence, hotel or other institution. The valve assembly includes a housing 12 having inlet ports 14, 16 for hot and cold water respectively. Outlet ports 18, 20 lead to a shower head and a tub faucet respectively and receive properly mixed water from the valve assembly. A valve cartridge (not shown) is receivable within the housing 12 and has a connection to a suitable handle accessible to the user so that by turning the handle and/or pulling on it the user is able to control the temperature and/or the pressure of the water exiting either of the outlet ports 18, 20. Of course, the valve assembly 10 will also include a suitable diverter so that the user can direct the water to either the shower or the tub as desired. The basic aspects of the valve assembly are well known and do not form a part of the present invention.

FIG. 1 also shows a shut-off valve 22 of the present invention arranged adjacent each inlet port 14, 16, the shut-off valve 22 being accessible to a repairman once he has gained access to the valve assembly 10 by removing the exterior handle and the escutcheon plate that covers the access opening through the wall behind which the valve assembly 10 is mounted. The shut-off valve 22 is intending to quickly and completely terminate the flow of water into the valve housing 12 through the inlet ports 14, 16 so that the repairman can easily and quickly repair or replace the cartridge contained within the housing 12. With a simple unidirectional movement to the shut-off valve actuator he can close the inlet ports and with a similar movement he can re-establish flow through the ports once the repair has been completed.

Figure 4:
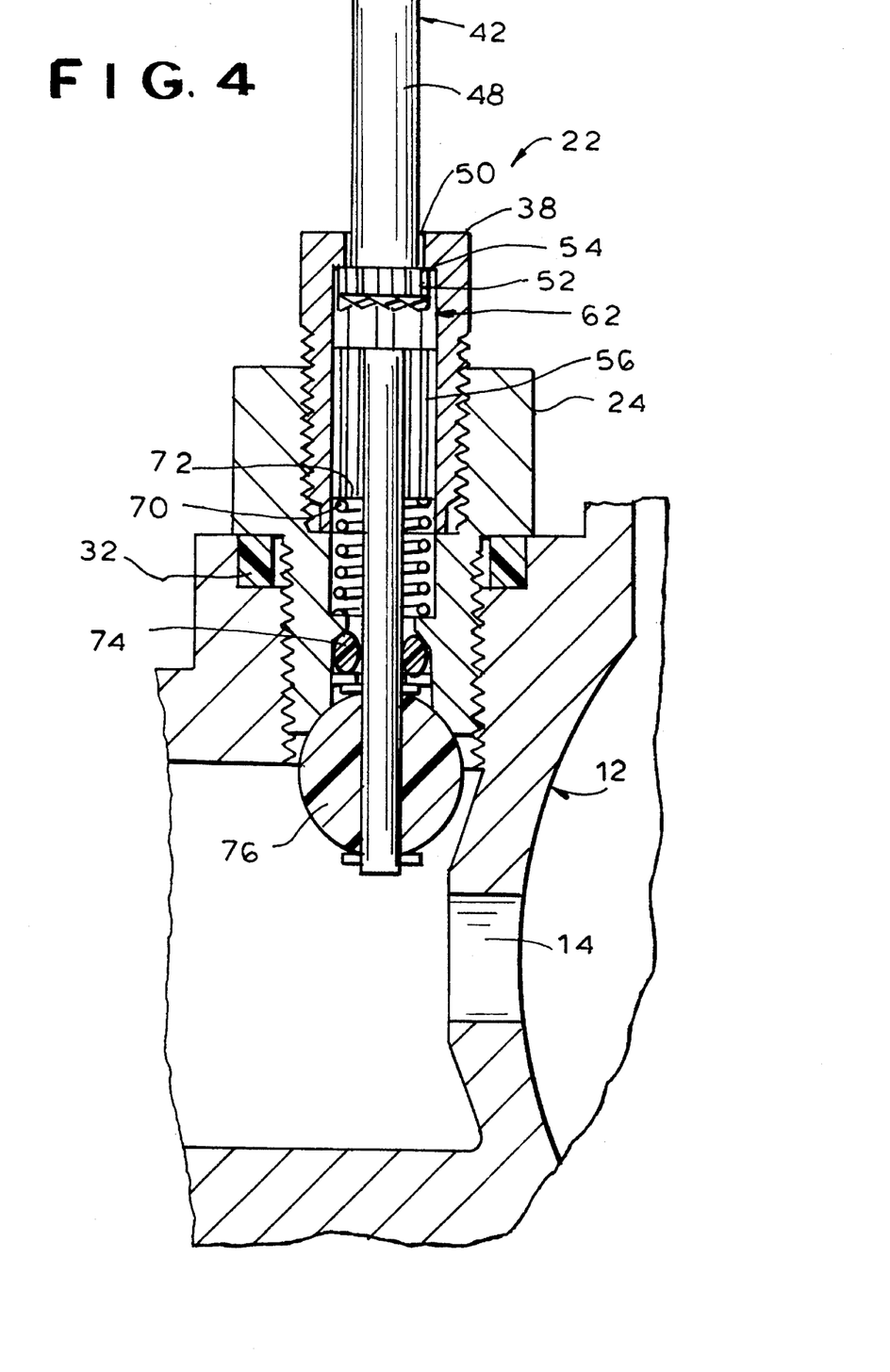
FIG. 4 is an enlarged cross-sectional view of the shut-off valve in its open position.
Figure 5:
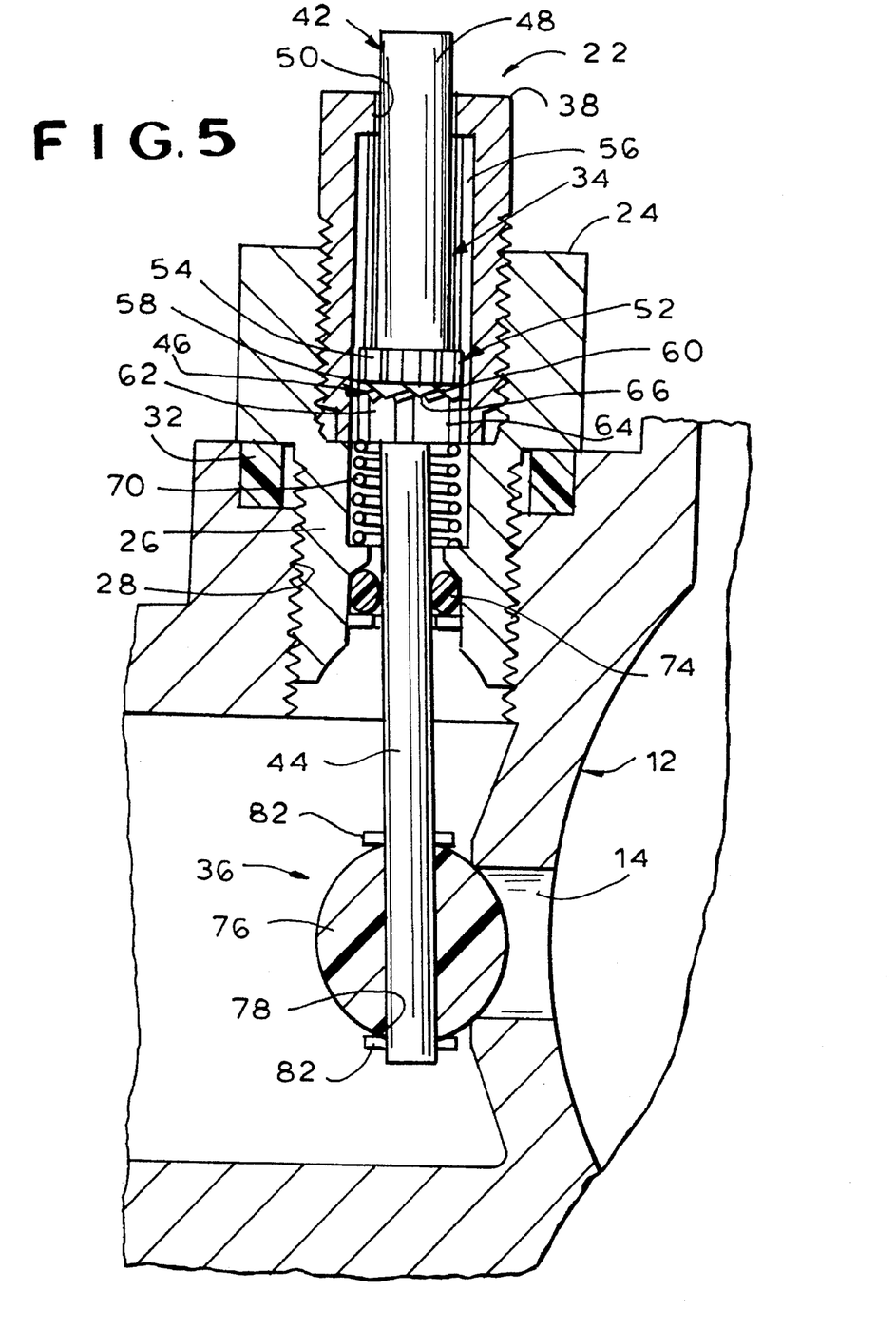
FIG. 5 is an enlarged cross-sectional view of the shut-off valve in its closed position.

The shut-off valve 22 of the present invention is seen in FIGS. 1 to 5 but it is best seen in FIGS. 4 and 5 which provide enlarged cross-sectional views thereof, FIG. 5 showing the valve in its closed position and FIG. 4 showing the valve in its open position. For the following description particular reference will be made to FIG. 5.

The shut-off valve 22 of this invention includes a generally cylindrical casing member 24 threadedly and sealingly connected to the valve housing 12 adjacent the inlet port 14. The casing 24 has a stepped lower section 26 that is threaded within a threaded bore 28 of a receiving boss 30 on the housing 12. A TEFLON(tm) seal ring 32 is retained between the casing member 24 and the boss 30 to seal the casing member to the housing 12.

A reciprocable valve actuator 34 is sealingly retained within the casing member 24 for direct movement between first and second positions, the actuator 34 carrying a valve member 36. The valve member 36 sealingly blocks the inlet port 14 when the actuator 34 is in its second position and opens the inlet port to normal water flow when the actuator 34 is in its first position (FIG. 4).

A cylindrical cap member 38 is threadedly mounted within an internal threaded bore 40 of the casing 24. The actuator 34 includes a push button member 42 retained within, but projecting from, the cap member 38. An actuator shaft 44 extends from the push button member 42 through the casing member 24 towards the adjacent inlet port. Ratchet means 46 are provided to hold the actuator 34 in either of its first or second positions. The valve member 36 is mounted to the actuator shaft 44 at its end distal from the cap member 38.

The push button member 42 includes a cylindrical rod member 48 having a length at least as great as the cap member 38 so that it can project therefrom through an upper flanged opening 50. The ratchet means 46 includes a first enlarged diameter ratchet member 52 at the internal end of the rod member 48, the first ratchet member 52 having a plurality of circumferentially spaced, longitudinally extending, external splines 54 which are engageable with corresponding longitudinally extending internal splines 56 provided within the cap member 38. The first ratchet member also has a plurality of circumferentially spaced generally raidally extending ratchet teeth 58 on the lower end face 60 thereof. The ratchet means also includes a second ratchet member 62 fixed to the upper internal end of the actuator shaft 44, the second ratchet member having a plurality of circumferentially spaced external splines 64 engageable with the internal splines 56 of the cap member 38 and a plurality of circumferentially spaced, generally radially extending, ratchet teeth 66 on the upper end face 68 thereof, the ratchet teeth 66 being complementary to and engageable with the ratchet teeth 58 of the first ratchet member 52. A compression spring 70 is positioned within the casing 24 and is engageable with the underside of the second ratchet member 62 when the actuator 34 is in its second position.

Figure 6:
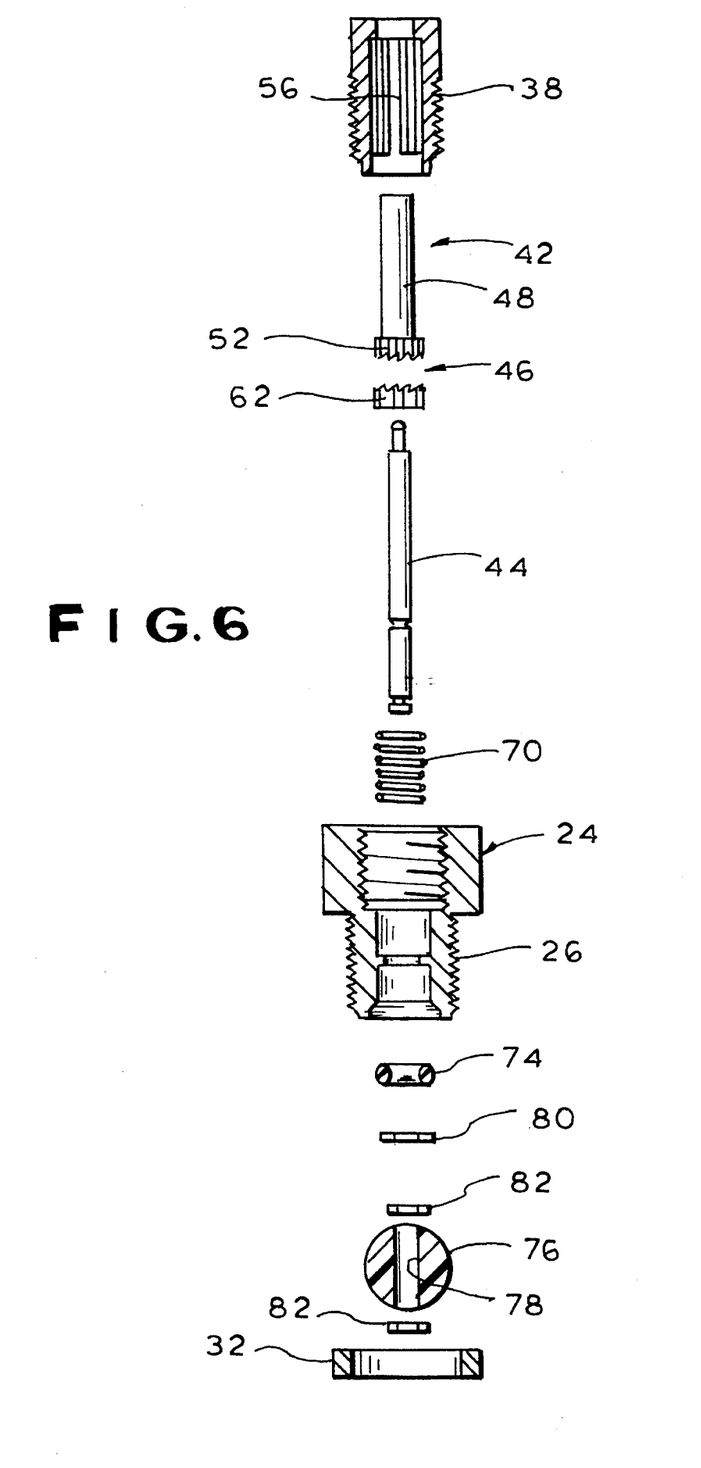
FIG. 6 is an exploded view of the internal components of the shut-off valve of this invention.

With particular reference to FIGS. 4 and 6 it will be seen that the internal spines 56 of the cap member 38 terminate short of the bottom of the cap member, such that the splines of the second ratchet member 62 will abut against the end face 72 of the splines 56 when the actuator 34 is in its second position. The second ratchet member 62 is rotatable under the influence of the complementary ratchet teeth 58, 66 to bring the splines 64 of the second ratchet member 62 into registry with the splines 56 of the cap member 38 so as to permit movement of the actuator 34 from its second position to its first position. This will be described hereinbelow in greater detail with reference to FIGS. 6 to 10.

FIG. 6 clearly shows the remaining components of the structure of this invention. An O-ring 74 surrounds the actuator shaft 44 within the casing lower portion 25 and acts as a fulcrum for movement of the shaft 44 as will be described below. The valve member 36 is a spherical ball member 76 having an axial bore 78 therethrough for reception of the actuator shaft 44, the ball member being of a diameter such that it will effectively block the inlet port when it is positioned thereagainst with the actuator 34 in its second position. A retainer clip 80 holds the O-ring 74 in position and retainer clips 82 hold the all member to the lower end of the actuator shaft 44.

Figures 7, 8, 9, 10:
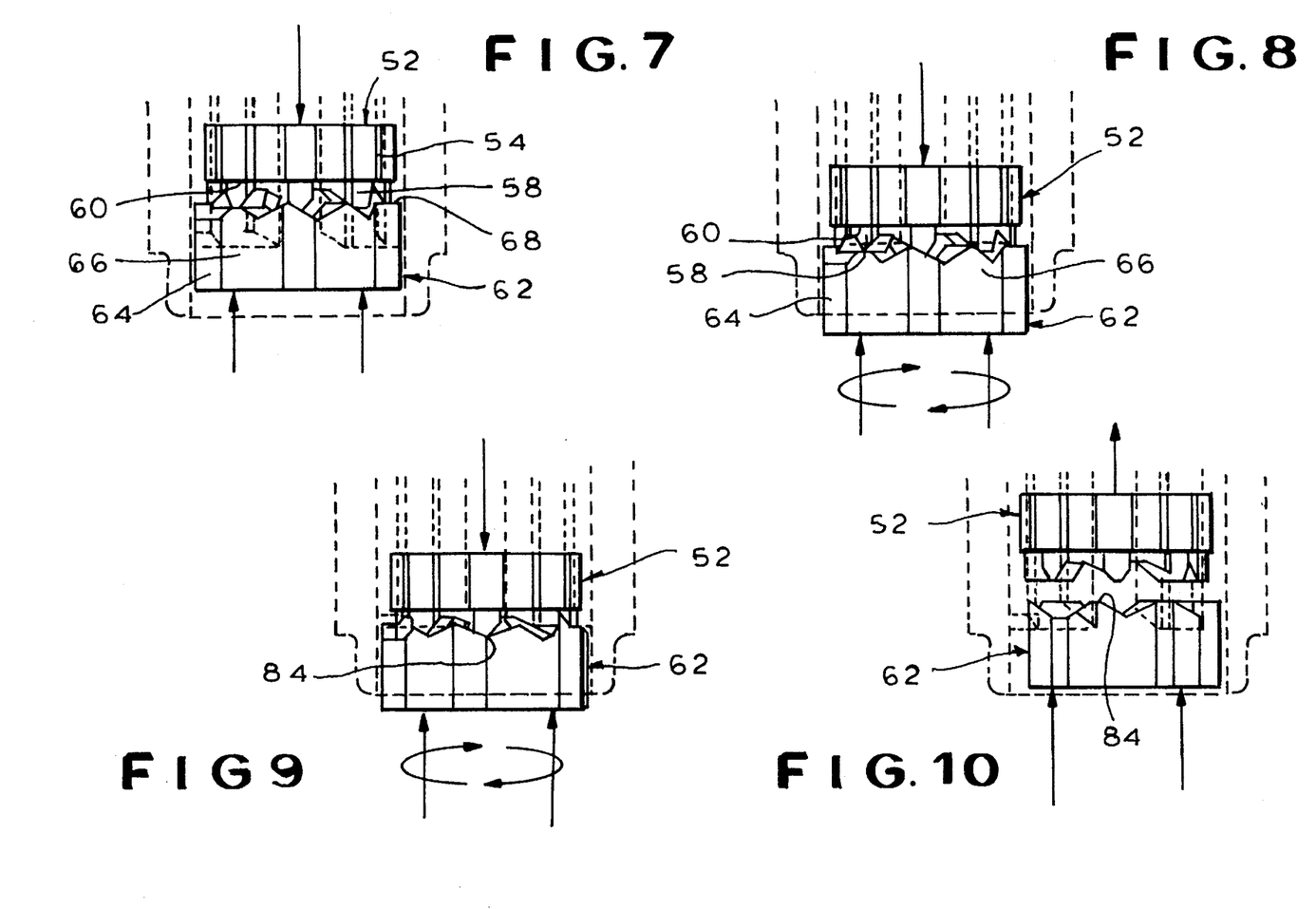
FIGS. 7, 8, 9 and 10 show the sequence of component movements as the shut-off valve is actuated.

As indicated above, once the repairman has obtained access to the valve housing 12 he will be presented with the two shut-off valves 22 of the present invention, both being in their first or open positions, with the push button thereof projecting from the cap member 38 as seen in FIG. 4. In order to close the inlet ports the repairman exerts a downwards force on each push button 42 to move it inwards of the cap member. As this movement occurs the teeth 58 of the first ratchet member 52 will engage the ratchet teeth 66 of the second ratchet member 62 as shown in FIG. 7. The external splines 54, 64 on the two ratchet members cooperate with the internal splines 56 of the cap member so that the push button 42 pushes the second ratchet member 62, the actuator shaft 44 and the valve member 36 straight downwardly towards the inlet port. Because the teeth 66 are vertically angled, presenting a ramp effect 84 to each first ratchet tooth, the second ratchet member 62 will want to rotate as it descends in the cap member 38. This tendency is restrained by the splines 56, 64.

Once the second ratchet member 62 descends below the end face 72 of the internal splines (FIG. 8) it is free to rotate and it will rotate due to the camming action of its angled ratchet teeth. The first ratchet member 52 is still constrained bay the interengaged splines 56, 42 and will not rotate. As the second ratchet member 62 continues to rotate (FIG. 9) its external splines 64 will be urged under the bottom edge 72 of the internal splines 56 of the cap member and will be constrained from reverse movement back into the cap member by the interengagement between the upper edge of the external splines 64 and the bottom edge 72 of the internal splines 56 (FIG. 10). The second ratchet member 62 is locked in place through this interengagement and it is held in place under the influence of the spring force generated through compression of the spring 70, which spring was progressively compressed as the ratchet members descended in the cap member.

When the second ratchet member 62 is locked in place the shut-off valve is in its second position and the valve member 36 is in the position of FIG. 5, blocking the inlet port 14. The ball member 76 will seal against the rim of the inlet port and will be held thereagainst by the pressure of the water in the inlet conduit leading to the housing 12.

It will be seen in FIG. 4 that the shut-off valve 22 is mounted to the housing 12 so that the distance from its axis A to the rim of the inlet port 14 is less than the radius of the ball member 76. As the actuator shaft 44 descends the ball members 76 will contact the protruding part 70 of the housing and will be cammed upstream until the ball member 76 rides over the rim and enters into scaling engagement therewith. Such camming motion is possible since there is no locking contact between the first and second ratchet members and since there is considerable space around the actuator shaft 44 within the lower portion 25 of the casing 24. Additionally, the O-ring 74 acts as a fulcrum about which the actuator shaft pivots as it descends toward the inlet port. This camming action of the actuator shaft allows the shut-off valve 22 to be located very close to the valve housing 12, making it easier for the repairman to operate the shut-off valve.

Once the repair has been effected, the repairman again pushes down on the push button 42 to bring the first ratchet member 52 into forceful contact with the second ratchet member 62, moving it slightly downwardly from the end face 72 of the internal splines. Such movement is against the spring 70 and the tendency is for the second ratchet member 62 to again rotate relative to the first ratchet member due to the angled nature of the ratchet teeth 66. This time the rotation of the second ratchet member brings the external splines 64 thereof into registry with the internal splines 56 of the cap member and the second ratchet member will now be free to rise within the cap member under the influence, at lest initially, of the spring 70. Water pressure acting on the ball member 76 will help to push the actuator assembly upwards as the water flow to the valve 10 is restored.

The present invention provides a simple yet effective mechanism for shutting off water flow to a valve or other device, allowing a repairman to effect necessary repairs without having to locate other shut-off valves or possibly having to shut off the water supply to an entire building. A simple push-on, push-off movement will effect closure or opening of the inlet port, allowing the repairman to complete his task in short order.

While the present invention has been described in conjunction with pressure balanced shower valves it is clear that a shut-off valve of this nature could be used in any type of installation having a need for such a valve. Accordingly the protection to be afforded this invention is to be determined from the claims appended hereto.

I claim:

1. A pressure balanced valve assembly comprising a valve housing having inlet ports for hot and cold water, an outlet port for properly mixed water of a desired temperature and pressure, means for controlling said valve and hence the temperature and pressure of water exiting said outlet port, and means for quickly stopping water flow into said valve housing at said inlet ports, said stopping means comprising, for each inlet port: casing means on said housing and providing access to the inlet port adjacent thereto; a linearly reciprocable valve actuator sealingly retained within said casing for direct movement between first and second positions; and a valve member fixed to said actuator for sealingly blocking said inlet port when said actuator is in said second position, said inlet port being open to normal water flow when said actuator is in said first position, an internally splined cap member within said casing, said actuator comprising: a push button member within and projecting from said cap member, an actuator shaft extending from said push button member through said casing towards said adjacent inlet port, and means for holding said actuator in either of said first or second positions, said valve member being affixed to the end of said actuator shaft opposite said cap member, said push button member including a cylindrical rod member projecting from said cap member, said holding means comprising: a first ratchet member at one end of said rod member within said cap member, said first ratchet member having a plurality of external, longitudinally extending splines for continuous engagement with corresponding longitudinally extending internal splines within said cap member, and a plurality of generally radially extending ratchet teeth on a lower end face thereof, a second ratchet member at one end of said actuator shaft proximate said first ratchet member, said second ratchet member having a plurality of external, longitudinally extending splines engageable with said cap member splines, and a plurality of generally radially extending ratchet teeth on an upper end face thereof and engageable with the ratchet teeth of said first ratchet member, and a compression spring within said casing engageable with said second ratchet member when said actuator is in said second position, said cap member splines terminating at a location such that the splines of said second ratchet member will abut against the bottom end of said cap member splines when said actuator is in said second position, said second ratchet member being rotatable by said first ratchet member to bring the splines of said second ratchet member into registry with the splines of said cap member so as to permit movement of said actuator from said second position to said first position.

2. The assembly of claim 1 including O-ring seal means being provided with said casing and engaging said actuator shaft.

3. A pressure balanced valve assembly comprising a valve housing having inlet ports for hot and cold water, an outlet port for properly mixed water of a desired temperature and pressure, means for controlling said valve and hence the temperature and pressure of water exiting said outlet port, and means for quickly stopping water flow into said valve housing at said inlet ports, said stopping means comprising, for each inlet port:

casing means on said housing and providing access to the inlet port adjacent thereto;

a reciprocable valve actuator sealingly retained within said casing for direct movement between first and second positions; and a valve member fixed to said actuator for sealingly blocking said inlet port when said actuator is in said second position, said inlet port being open to normal water flow when said actuator is in said first position, an internally splined cap member within said casing, said actuator comprising:

a push button member within and projecting from said cap member, an actuator shaft extending from said push button member through said casing towards said adjacent inlet ports, and means for holding said actuator in either of said first or second positions, said valve member being affixed to the end of said actuator shaft opposite said cap member, said push button member including a cylindrical rod member projecting from said cap member, said holding means comprising a first ratchet member at one end of said rod member within said cap member, said first ratchet member having a plurality of external, longitudinally extending splines for continuous engagement with corresponding longitudinally extending internal splines within said cap member, and a plurality of generally radially extending ratchet teeth on a lower end face thereof, a second ratchet member at one end of said actuator shaft proximate said first ratchet member, said second ratchet member having a plurality of external, longitudinally extending splines engageable with said cap member splines, and a plurality of generally radially extending ratchet teeth on an upper end face thereof and engageable with the ratchet teeth of said first ratchet member, and a compression spring within said casing engageable with said second ratchet member when said actuator is in said second position, said cap member splines terminating at a location such that the splines of said second ratchet member will abut against the bottom end of said cap member splines when said actuator is in said second position, said second ratchet member being rotatable by said first ratchet member to bring the splines of said second ratchet into registry with the splines of said cap member so as to permit movement of said actuator from said second position to said first position, O-ring seal means being provided within said casing and engaging said actuator shaft, said valve member being a spherical ball member having an axial bore therethrough for reception of said actuator shaft, said ball member being of a diameter to effectively block said inlet port when it is positioned thereagainst with said actuator in said second position.

4. A quick-acting shut-off valve for an inlet port of an hydraulic installation having a housing containing such inlet port, comprising: casing means on said housing and providing access to said inlet port adjacent thereto; a reciprocable valve actuator sealingly retained within said casing for direct movement between first and second positions; and a valve member fixed to said actuator for sealingly blocking said inlet port when said actuator is in said second position, said inlet port being open to normal water flow when said actuator is in said first position, said valve member being a spherical ball member having an axial bore therethrough for a shaft of said actuator, said ball member being of a diameter to effectively block said inlet port when said ball member is positioned against said inlet port with said actuator in said second position.

5. A quick-acting shut-off valve for an inlet port of an hydraulic installation having a housing containing such inlet port, comprising: casing means on said housing and providing access to said inlet port adjacent hereto; a reciprocable valve actuator sealingly retained within sad casing for direct movement between first and second positions; and a valve member fixed to said actuator for sealingly blocking said inlet port when said actuator is in said second position, said inlet port being open to normal water flow when said actuator is in said first position, an internally splined cap member being provided within said casing, wherein said actuator comprising: a push button member within and projecting from said cap member an actuator shaft extending from said push button member through said casing towards said adjacent inlet port, and means for holding said actuator in either of said first or second positions, said valve member being affixed to the end of said actuator shaft opposite said cap member, said push button member including a cylindrical rod member projecting from said cap member, said holding means comprising: a first ratchet member at one end of said rod member within said cap member, said first ratchet member having a plurality of external, longitudinally extending splines for continuous engagement with corresponding longitudinally extending splines for continuous engagement with corresponding longitudinally extending internal splines within said cap member, and a plurality of generally radially extending ratchet teeth on a low end fact thereof, a second ratchet member at one end of said actuator shaft proximate said first ratchet member, said second ratchet member having a plurality of external, longitudinally extending splines engageable with said cap member splines, and a plurality of generally radially extending ratchet teeth on an upper end face thereof and engageable with the ratchet teeth of said first ratchet member; and a compression spring within said casing engageable with said second ratchet member when said actuator is in said second position, said cap member splines terminating at a location such that the splines of said second ratchet member will abut against the end of said cap member splines when said actuator is in said second position, said second ratchet member being rotatable by said first ratchet member to bring the splines of said second ratchet member into registry with the splines of said cap member so as to permit movement of said actuator from said second position to said first position, O-ring seal means being provided within said casing and engaging said actuator shaft, said valve member being a spherical ball member having an axial bore therethrough for reception of said actuator shaft, said ball member being of a diameter to effectively block said inlet portion when it is positioned thereagainst with said actuator in said second position.

6. A quick-acting shut-off valve for an inlet port of an hydraulic installation having a housing containing such inlet port, comprising: casing means on said housing and providing access to said inlet port adjacent thereto; a reciprocable valve actuator sealingly retained within said casing for direct movement between first and second positions; and a valve member fixed to said actuator for sealingly blocking said inlet port when said actuator is in said second position, said inlet port being open to normal water flow when said actuator is in said first position, said push button member including a cylindrical rod member projecting from said cap member, said holding means comprising: a first ratchet member at one end of said rod member within said cap member, said first ratchet member having a plurality of external, longitudinally extending splines for continuous engagement with corresponding longitudinally extending splines for continuous engagement with corresponding longitudinally extending internal splines within said cap member, and a plurality of generally radially extending ratchet teeth on a lower end fact thereof, a second ratchet member at one end of said actuator shaft proximate said first ratchet member, said second ratchet member having a plurality of external, longitudinally extending splines engageable with said cap member splines, and a plurality of generally radially extending ratchet teeth on an upper end face thereof and engageable with the ratchet teeth of said first ratchet member; and a compression spring within said casing engageable with said second ratchet member when said actuator is in said second position, said cap member splines terminating at a location such that the splines of said second ratchet member will abut against the end of said cap member splines when said actuator is in said second position, said second ratchet member being rotatable by said first ratchet member to bring the splines of said second ratchet member into registry with the splines of said cap member so as to permit movement of said actuator from said second position to said first position, O-ring seal means being provided within said casing and engaging said actuator shaft, said valve member being a spherical ball member having an axial bore therethrough for reception of said actuator shaft, said ball member being of a diameter to effectively block said inlet port when it is positioned thereagainst with said actuator in said second position.

* * * * *